United States Patent [19]

Seo et al.

[11] Patent Number: 4,986,893
[45] Date of Patent: Jan. 22, 1991

[54] PROCESS FOR PRODUCING PITCH FOR CARBON MATERIALS

[75] Inventors: Ikuo Seo; Saburou Takahashi; Tooru Ohono, all of Iwaki, Japan

[73] Assignee: Kureha Kagaku Kogyo Kabushiki Kaisha, Tokyo, Japan

[21] Appl. No.: 461,036

[22] Filed: Jan. 4, 1990

Related U.S. Application Data

[63] Continuation-in-part of Ser. No. 214,529, Jul. 1, 1988, abandoned.

Foreign Application Priority Data

Jul. 8, 1987 [JP] Japan ................. 62-170739
Jun. 30, 1988 [JP] Japan ................. 63-163064

[51] Int. Cl.$^5$ ................. C01C 3/00
[52] U.S. Cl. ................. 208/39; 208/22; 208/44; 585/422; 585/425
[58] Field of Search ................. 208/22, 39, 44

[56] References Cited

U.S. PATENT DOCUMENTS

| | | | |
|---|---|---|---|
| 3,629,379 | 12/1971 | Otani | 423/447.6 |
| 3,649,234 | 3/1972 | Charpentier | 264/12 |
| 3,702,054 | 11/1972 | Araki et al. | 264/DIG. 19 |
| 3,718,493 | 2/1973 | Joo | 208/22 |
| 3,812,240 | 5/1974 | Whitaker | 423/447 |
| 3,865,566 | 2/1975 | Keist | 264/8 |
| 3,919,376 | 11/1975 | Schulz | 264/102 |
| 3,974,264 | 8/1976 | McHenry | 423/447.1 |
| 3,997,654 | 12/1976 | Kolling et al. | 423/447.7 |
| 4,016,247 | 4/1977 | Otani | 423/447.4 |
| 4,026,788 | 5/1977 | McHenry | 208/39 |
| 4,032,430 | 6/1977 | Lewis | 208/39 |
| 4,042,486 | 8/1977 | Asano et al. | 208/44 |
| 4,058,386 | 11/1977 | Faulkner | 264/8 |
| 4,115,527 | 9/1978 | Otani | 423/447.4 |
| 4,208,267 | 6/1980 | Diefendorf et al. | 208/22 |
| 4,209,500 | 6/1980 | Chwastiak | 423/447.6 |
| 4,243,512 | 1/1981 | Seo | 423/447.1 |
| 4,246,017 | 1/1981 | Phillips | 264/8 |
| 4,293,533 | 10/1981 | Asano | 423/447.6 |
| 4,359,444 | 10/1982 | Shah | 264/8.211 |
| 4,402,928 | 9/1983 | Lewis et al. | 208/22 |
| 4,431,513 | 2/1984 | Lewis | 208/44 |
| 4,454,020 | 6/1984 | Izumi et al. | 208/22 |
| 4,457,828 | 7/1984 | Lewis | 208/22 |
| 4,496,637 | 1/1985 | Shimada | 423/447.2 |
| 4,521,294 | 6/1985 | Uemera | 208/23 |
| 4,529,498 | 7/1985 | Watanabe | 208/44 |
| 4,534,850 | 8/1985 | Izumi et al. | 208/22 |
| 4,589,974 | 5/1986 | Izumi et al. | 208/22 |
| 4,601,813 | 7/1986 | Izumi | 208/22 |
| 4,655,902 | 4/1987 | Izumi et al. | 208/22 |
| 4,746,470 | 5/1988 | Fujima et al. | 423/447.1 |
| 4,789,455 | 12/1988 | Machida et al. | 208/39 |
| 4,891,126 | 1/1990 | Mochida et al. | 208/22 |

FOREIGN PATENT DOCUMENTS

| | | |
|---|---|---|
| 0054437 | 1/1982 | European Pat. Off. . |
| 0057108 | 8/1982 | European Pat. Off. . |
| 0090475 | 7/1983 | European Pat. Off. . |
| 0090476 | 10/1983 | European Pat. Off. . |
| 7304398 | 2/1973 | Netherlands . |
| 2129825 | 8/1984 | United Kingdom . |
| 2164351 | 3/1986 | United Kingdom . |

*Primary Examiner*—Helane E. Myers
*Attorney, Agent, or Firm*—Oblon, Spivak, McClelland, Maier & Neustadt

[57] ABSTRACT

Disclosed herein is a process for producing a substantially quinoline-soluble and optically anisotropic pitch for carbon materials, which process comprises the steps of (1) polymerizing naphthalene by heating at a temperature of not higher than 330° C. for 0.5 to 100 hours in the presence of Lewis acid catalyst, (2) removing said catalyst from the reaction mixture, (3) subjecting said reaction mixture to thermal treatment at a temperature of 390° to 450° C. for 1 to 5 hours under a pressure of not less than an atmospheric pressure so as to produce neither a quinoline-insoluble pitch nor optically anisotropic pitch, thereby carrying out aromatization of the polymerizate of naphthalene, and (4) heating the thus treated material at a temperature of 350° to 380° C. for 3 to 10 hours under a reduced pressure while flowing an inert gas, thereby removing the volatile components for said material, and the pitch produced by the process.

6 Claims, 1 Drawing Sheet

PROCESS FOR PRODUCING PITCH FOR CARBON MATERIALS

CROSS-REFERENCE TO RELATED APPLICATION

The present invention is a continuation-in-part application of U.S. patent application, Ser. No. 214,529 filed on July 1, 1988 now abandoned.

BACKGROUND OF THE INVENTION

The present invention relates to a process for producing a pitch which is substantially soluble in quinoline and is a raw material for producing carbon materials. More in detail, the present invention relates to a process for producing a substantially quinoline-soluble and optically anisotropic pitch for carbon materials, which is suitable as a raw material for various carbon materials necessitating high strength, such as high-performance carbon fibers, graphite fibers or reinforcing materials for composite resin, the optically anisotropic and quinoline-soluble pitch being produced from naphthalene as the raw material and a pitch for carbon materials produced by the process.

The carbon fibers now in market are classified based on raw materials therefor into polyacrylonitrile (PAN)-based carbon fiber produced from PAN and pitch-based carbon fibers produced from pitches. In general, PAN-based carbon fibers have the excellent specific properties, particularly in the point of tensile strength as compared to pitch-based carbon fibers. Accordingly, as the high-performance carbon fibers of high strength and high modulus of elasticity, PAN-based carbon fibers have been in the main current hitherto. However, since the raw material for PAN-based carbon fibers is expensive and the yield of carbonization of PAN is poor, the studies for producing pitch-based carbon fibers, which have the same tensile strength and tensile modulus of elasticity as PAN-based carbon fibers, from the pitch occupying the economical superiority, have been carried out, and several methods therefor have been proposed.

For instance, it has been reported that graphite fibers which has an X-ray diffraction pattern characterized by the presence of (112)-cross lattice line, (100)-line and (101)-line, namely has a high three-dimensional structure and has an interlayer spacing (doo2) of not larger than 3.37 Å, an apparent layer size (La) of not smaller than 1000 Å and an apparent layer height (Lc) of not smaller than 1000 Å can be produced by a process comprising the steps of (1) heating a petroleum pitch, coal tar pitch or acenaphthylene pitch at 350° to 500° C. for a sufficient time for forming a mesophase of about 40 to 90% by weight, thereby obtaining a carbonaceous pitch which is non-thixotropic and has a viscosity of 10 to 200 poise at the spinning temperature thereof, (2) spinning the thus obtained carbonaceous pitch, thereby obtaining pitch fibers, (3) infusibilizing the thus obtained pitch fibers at 250° to 400° C. in an oxygen-containing atmosphere, thereby obtaining infusibilized fibers, (4) heating the thus obtained infusibilized fibers at a temperature not lower than 1000° C. in an inert atmosphere and then (5) heating the thus heated fibers at a temperature not lower than about 2500° C. (refer to Japanese Patent Application Laid-Open No. 49-19127/1974).

As has been disclosed in the above-mentioned Japanese Patent Application Laid-Open No. 49-19127/1974, it has been considered hitherto that the use of the mesophase pitch is indispensable for producing the high-performance pitch-based carbon fibers. The above-mentioned consideration is due to the fact that in the case of melt-spinning the mesophase pitch which has molecular orientation, the molecules of the pitch are easily aligned parallel to the fiber axis. However, since the softening point of the mesophase pitch is generally high, there is a defect therein that the temperature of melt-spinning thereof is high and the pitch becomes unstable thermally. Further, since the mesophase pitch is a heterogeneous mixture of an isotropic pitch and liquid crystal of pitch, it has been deemed that it is difficult to obtain the homogeneous pitch fibers from the mesophase pitch.

In order to solve the above-mentioned weak points a pitch usable for melt spinning, which is not necessarily optically anisotropic in the stage of the pitch for spinning, however, which is excellent in spinnability and is converted into an optically anisotropic state in the stage of spinning or calcining, and a process for producing carbon fibers by using such a pitch have been proposed.

For instance, Japanese Patent Application Laid-Open No. 58-18421/1983 reports a process comprising the steps of (1) melt-spinning an optically isotropic premesophase carbonaceous substance or a pitch-like substance mainly consisting of an optically isotropic premesophase carbonaceous substance under the melt-spinning conditions of not substantially increasing the amount of mesophase carbonaceous substance, (2) infusibilizing the thus melt-spun fibers and (3) carbonizing the thus infusibilized fibers, thereby converting the premesophase carbonaceous substance or the pitch-like substance containing the premesophase carbonaceous substance into the optically anisotropic mesophase carbonaceous substance substantially.

Further a dormant anisotropic pitch of the atomic ratio of hydrogen to carbon (H/C) of 0.55 to 1.2, which (1) contains as a component for forming the dormant anisotropy, a substantially quinoline-soluble polycyclic and polynuclear hydrocarbon which is obtained by partially hydrogenating polycyclic and polynuclear hydrocarbons existing in mesophase pitch, (2) forms, in the molten state thereof, a wholly homogeneous and optically isotropic single phase without substantially forming mesophase and (3) in the case where an external force is applied thereon, shows a tendency of preferred orientation along the direction of the external force, is disclosed (refer to EP-A2-54,437).

However, in every one of the above-mentioned cases, a separate step such as hydrogenation treatment is necessary and particularly, a specified spinning condition is necessary. Accordingly, it was difficult to obtain the high-performance carbon fiber.

Moreover, in the former case, there was no example of producing carbon fibers while singly using the premesophase pitch, namely the quinoline-soluble pitch, and the pitch for melt-spinning is the material containing a quinoline-insoluble component.

The present inventors have also found out that a conspicuous optical conversion of from isotropy to anisotropy progresses and the carbon fibers or graphite fibers of high performance are obtained in the process comprising the steps of (1) polymerizing naphthalene as the raw material by heating thereof in the presence of a Lewis acid catalyst, (2) removing the catalyst from the reaction mixture, thereby obtaining a pitch-like substance, (3) heating the thus obtained substance under an ordinary atmospheric pressure or a reduced pressure while flowing an inert gas, thereby removing volatile components and obtaining a precursor pitch which shows the low softening point, does not contain polycyclic and polynuclear high molecular component of progressed molecular orientation (which is the quinoline-insoluble component), shows the optical isotropy and is easily subjected to spinning, (4) spinning the thus obtained precursor pitch, thereby obtaining the optically isotropic pitch fibers and (5) infusibilizing, calcining and carbonizing the thus obtained pitch fibers. (Refer to U.S. patent application Ser. No. 773,037 now abandoned, GB-A-2,164,351).

However, in the thus obtained carbon fibers, there was a room for improvement concerning the mechanical specific properties (particularly, concerning the tensile modulus of elasticity).

Generally, in the case of producing the high-performance carbon fibers, it is necessary that the pitch for spinning is provided with the molecular orientability to the extent that the spun fibers can be oriented in the step of spinning and, at the same time, with the spinnability and the fluidity. Hitherto, the molecular orientability of the mesophase pitch containing the quinoline-insoluble component has been raised by increasing the molecular weight by thermal treatment. However, there have been problems therein concerning the spinnability and thermal stability at the time of spinning such a pitch. Further, in the case of melt-spinning the above-mentioned mesophase pitch containing the quinoline-insoluble components, it is apt to form a large leaf-form domain in the pitch fiber due to the high orientability thereof. Accordingly, the temperature of melt-spinning should be raised, the pitch becomes thermally unstable and there is a weak point that the homogeneous pitch fibers are not available.

Namely, in order to avoid the above-mentioned defects, a specified condition of spinning was necessary.

The internal structure and the performance of carbon fibers are largely influenced by the chemical structure of the pitch used for spinning. Hitherto, since the pitch fibers spun from the optically isotropic pitch scarcely had the orientability, the thus obtained pitch fibers are particularly poor in the tensile modulus of elasticity, and in order to obtain the high-performance carbon fibers, it was necessary to suitably select the conditions of the treatment of infusibilization and to carry out the stretching and calcining at a high temperature. Such a process was industrially disadvantageous.

As a result of the present inventor's earnest researches for solving the above-mentioned problems, the following information was obtained and on the basis of the information, the present invention have been completed.

The pitch produced from naphthalene as the raw material comprises the chainly-linked aromatic compounds having 6 to 12 naphthalene rings and naphthene rings. The planarity of the above-mentioned ring component has been distorted due to the presence of the naphthene ring therein.

By subjecting the above-mentioned pitch to a thermal treatment in the first stage of thermal treatment at a temperature of 390° to 450° C. for 1 to 5 hours under a pressure of not less than an atmospheric pressure so as to produce neither a quinoline-insoluble pitch nor optically anisotropic pitch, the polymerization of the unstable substances remaining in the pitch proceeds or the condensation of the naphthalene rings proceeds by partial dehydration from the naphthene rings resulting in the conversion of the pitch into the stable compounds. Namely, the thermal stability of the pitch is raised (the above-mentioned step is referred to as the aromatization reaction). The first stage of thermal treatment is carried out in a closed system or an open system.

The volatile components generated from the pitch in decomposition by the first stage of thermal treatment is removed by carrying out the second stage of thermal treatment at 350° to 380° C. under a reduced pressure in a flow of an inert gas.

Since the thermally stabilized component has the carbon skeleton which can constitute the mesophase, an optical anisotropy becomes observable in the pitch subjected to the second stage of thermal treatment.

As mentioned above, by promoting the aromatization of the pitch as compared to the case of obtaining the conventional quinoline-soluble and optically isotropic pitch and subjecting the pitch to thermal treatment under the conditions by which the component of high molecular weight becoming the quinoline-insoluble material does not form, it was possible to obtain the pitch which shows the suitably low softening point and melt viscosity, is excellent in spinnability, is substantially soluble in quinoline and shows the optical anisotropy.

Further, by using the above-mentioned quinoline-soluble and optically anisotropic pitch, it was possible to obtain the high-performance carbon fibers and graphite fibers which have the anisotropic structure and in which the tensile modulus of elasticity has been further improved as compared with the carbon fibers obtained from the conventional quinoline-soluble and optically isotropic pitch, without relying upon any specified condition of spinning.

SUMMARY OF THE INVENTION

The object of the present invention is to provide a process for producing a pitch which is substantially soluble in quinoline, shows the optical anisotropy, is produced from naphthalene as the raw material and is suitable as the raw material for producing high-performance carbon fibers, graphite fibers having the anisotropic structure or reinforcing materials for composite resin.

The process according to the present invention comprises the steps of (1) polymerizing naphthalene by heating at a temperature of not higher than 330° C. for 0.5 to 100 hours in the presence of a Lewis acid catalyst, (2) removing said catalyst from the reaction mixture, (3) subjecting said reaction mixture to thermal treatment at a temperature of 390° to 450° C. for 1 to 5 hours under a pressure of not less than an atmospheric pressure so as to produce neither a quinoline-insoluble pitch nor optically anisotropic pitch, thereby carrying out aromatization of the polymerizate of naphthalene, and (4) heating the thus treated material at a temperature of 350° to 380° C. for 3 to 10 hours under a reduced pressure while flowing an inert gas, thereby removing volatile components from said material, and obtaining substantially quinoline soluble and optically anisotropic pitch.

The another object of the present invention is to provide the substantially quinoline-soluble and optically anisotropic pitch for carbon material produced by the process according to the present invention, the substantially quinoline-soluble and optically anisotropic pitch being produced from naphthalene as the raw material and showing the softening point of 195° to 230° C., an atomic ratio of hydrogen to carbon (H/C) of not less than 0.53 and below 0.60, a mean molecular weight of 500 to 1500, a content of the benzene-insoluble material of over 45% by weight and not more than 70% by weight and a melt-viscosity of 10 to 100 poise at a temperature of 300° C.

BRIEF DESCRIPTION OF THE DRAWINGS

Of the attached drawings.

DETAILED DESCRIPTION OF THE INVENTION

Figure 1:
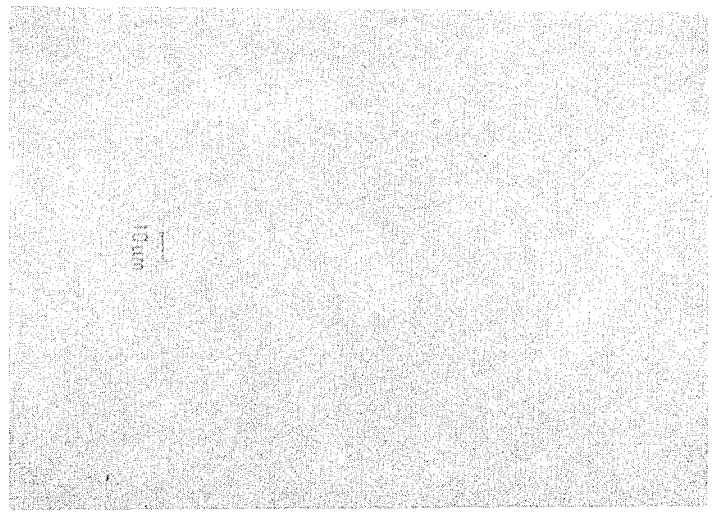
FIG. 1 is a polarizing microscopic photograph which shows the structure of crystallites of the pitch obtained in Example 1 of the present invention.

The optically anisotropic pitch has been obtained by subjecting the optically isotropic pitch to the thermal treatment. Namely, in the case of heating the optically isotropic pitch at a temperature of not lower than 350° C., the reactions such as aromatization, etc. are promoted and small spherulites having optical anisotropy appear in the optically isotropic pitch. The small spherulite is composed of the quinoline-insoluble components and grows gradually by raising the temperature of the pitch or extending the time for treatment, and then the aggregation and growth of the small spherulites occurs. Through the above-mentioned process, the pitch comes to show optical anisotropy, and the viscosity of the pitch increases resulting finally in the solidified state. The phase of the spherulites showing optical anisotropy is referred to as the mesophase, and the pitch containing the mesophase or the pitch of which the greater parts has come to be the mesophase is called as the mesophase pitch.

The conventional carbon fibers having the optically anisotropic structure are generally produced by spinning the mesophase pitch containing the above-mentioned quinoline-insoluble components, infusibilizing the thus spun fibers and carbonizing the thus infusibilized fibers. However, the softening point of the mesophase pitch is generally high and accordingly, the temperature of melt-spinning the mesophase pitch becomes higher. Namely, the mesophase pitch is thermally unstable and there is a weak point that it is difficult to obtain the homogeneous pitch fibers. The component constituting the mesophase pitch is composed, as has been stated in "Carbon, 16, 425~(1978), of the condensed polycyclic aromatic compounds of the molecular weight of 2000 to 4000.

In the case where the conventional mesophase pitch containing the quinoline-insoluble components was further subjected to thermal treatment in order to promote the molecular orientation and to increase the molecular weight, the softening temperature of the thus treated pitch was raised and although the melt-viscosity of the thus treated pitch was 10 to 100 poises at 350° to 400° C., the fluidity and the spinnability of the pitch were lowered resulting in the difficulty of spinning. Moreover, the melt-spinning of the conventional mesophase pitch at an economical spinning speed was also difficult.

The substantially quinoline-soluble and optically anisotropic pitch of the present invention, which can solve the above-mentioned problems, can be produced by the following process:

Naphthalene as the raw material is polymerized by heating thereof for 0.5 to 100 hours at a temperature of not higher than 330° C., preferably 100° to 300° C. in the presence of a Lewis acid catalyst.

As the Lewis acid catalyst used herein, the catalyst consisting essentially of $AlCl_3$ or $BF_3$, preferably the catalyst consisting of $AlCl_3$ or $BF_3$, further preferably $AlCl_3$ is used.

Although the Lewis acid catalyst may be used in an amount of 5 to 50 parts by weight to 100 parts by weight of naphthalene, the amount of 8 to 20 parts by weight is preferable. Further, in the case where the heating temperature goes over 330° C., the quinoline-insoluble components are formed due to the formation of the mesophase pitch. Accordingly, such a situation is undesirable. Moreover, even in the case where the Lewis acid catalyst is used in an amount of more than 50 parts by weight, the efficiency of polymerization does not change so much and the removal of the catalyst becomes complicated. Accordingly, the use of such a large amount of the catalyst is not economical.

After removing the catalyst from the polymerized naphthalene, the polymerized naphthalene is subjected to thermal treatment in temperature-time condition selected in the range of 390° to 450° C., preferably 400° to 430° C. for 1 to 5 hours, preferably 1 to 3 hours under a pressure of not less than an atmospheric pressure so as to produce neither a quinoline-insoluble pitch nor optically anisotropic pitch, thereby the thus treated material is thermally stabilized due to the promotion of aromatization of the pitch. In this case, when the thermal treatment is continued for a long time period at a temperature of higher than 450° C., the quinoline-insoluble materials are formed. Namely such a situation is undesirable.

The pressure of the reactor in this thermal treatment is not less than an atmospheric pressure, preferably not over 5 kg $f/cm^2G$, and further preferably not over 3.5 kg $f/cm^2G$.

The thus obtained pitch is a substantially quinoline-soluble and optically isotropic pitch when observed by a polarizing microscope.

The pitch is heated further at 350° to 380° C., preferably 360° to 370° C. for 3 to 10 hours, preferably 4 to 6 hours under a reduced pressure, preferably under a pressure of 10 to 50 Torr while flowing an inert gas to remove the volatile components such as unreacted substances, decomposition products, etc. and to obtain the substantially quinoline-soluble and optically anisotropic pitch.

The thus obtained pitch shows the softening point of 195°–230° C., H/C of not less than 0.53 and below 0.60, the mean molecular weight of 500 to 1500, the amount of benzene-insoluble components of over 45% by weight and not more than 70% by weight and the melt-viscosity of 10 to 100 poises at 300° C. The pitch is substantially soluble in quinoline and shows the optical anisotropy when observed by a polarizing microscope. Further, the words "substantially soluble in quinoline" mean that the content of the quinoline-insoluble components of the pitch is not more than 0.5% by weight, preferably not more than 0.1% by weight.

The softening point of the substantially quinoline-soluble and optically anisotropic pitch according to the present invention is lower than the softening point of the conventional optically anisotropic pitch, and so the pitch according to the present invention is excellent in fluidity.

The thus obtained pitch is molded, infusibilized and carbonized by the conventional manufacture method and optionally further graphitized. Thus, the carbon materials like a carbon fiber etc. is easily obtainable. The mold is carried out in the viscosity condition suitable to mold at a temperature of higher than the softening point of the pitch.

For instance, when the fiber having fiber diameter of about 10 μm is spun, melt-spinning is carried out by extruding the pitch at a temperature of higher than the softening point of the pitch by 60° to 80° C. from nozzle under a pressure of 0.5 to 3.0 kg f/cm²G and the thus spun pitch fibers are taken-up at a rate of 400 to 100 m/min.

The thus obtained pitch fiber is subjected to infusibilization by heating thereof to 230° to 300° C. at ordinarily a temperature-raising speed of 0.5° to 5° C./min in an oxidative gaseous atmosphere and maintaining the fiber for 30 to 60 minutes ordinarily.

In the next place, the thus infusibilized fibers are heated to above the carbonization temperature, preferably above 900° C. in an inert gas, for instance, nitrogen gas. By such an operation, the infusibilized fibers are carbonized and calcined to be the carbon fibers.

The graphite fibers are obtained by further heating the thus obtained carbon fibers at a temperature of not lower than 2000° C. in an inert gas.

The carbon fiber obtained by using the substantially quinoline-soluble and optically anisotropic pitch of the present invention as above forms a compact structure not containing the large domain. The thus obtained carbon fiber shows the tensile strength of at least 250 kg f/mm² and the tensile modulus of elasticity of at least $15 \times 10^3$ kg f/mm², and the graphite fiber shows the tensile strength of at least 300 kg f/mm² and the tensile modulus of elasticity of at least $25 \times 10^3$ kg f/mm².

Namely, both the above-mentioned fibers are excellent in performance.

As mentioned above, the pitch obtained by the process of the present invention was explained while using the carbon fibers as an example, however, the pitch of the present invention is excellent as the raw material for various carbon materials, to which high strength is necessitated, such as reinforcing materials for composite resin.

According to the process for producing the pitch of the present invention, after subjecting naphthalene to the treatment of Lewis acid catalyst, the reaction mixture is subjected to thermal treatment under a pressure of not less than an atmospheric pressure so as to produce neither a quinoline-insoluble pitch nor optically anisotropic pitch, and then the volatile materials in the reaction mixture are removed. Accordingly, it is possible to obtain the substantially quinoline-soluble and optically anisotropic pitch.

Since the substantially quinoline-soluble and optically anisotropic pitch according to the present invention is low in the softening point and also in the melt-viscosity, it is easy to subject the pitch to melt-spinning, and by using the above-mentioned pitch, it is possible to obtain the high-performance carbon fibers and graphite fibers both having the anisotropic structure without using the special conditions for spinning. Moreover, the above-mentioned pitch is also useful as carbon bead or the reinforcing materials for composite materials etc.

The present invention will be explained more in detail while referring to Examples as follows, and moreover, these Examples are only exemplificative and the present invention is not limited to these Examples.

Further, each of the specific properties of the pitch according to the present invention and the physical properties of the carbon fibers or graphite fibers were measured as follows:

(1) H/C:

From the values of elemental analysis measured while following Japanese Industrial Standards (JIS) M-8813, H/C was calculated from the undermentioned formula:

$$H/C = \frac{(\text{hydrogen content, \% by weight})/1}{(\text{carbon content, \% by weight})/12}$$

(2) Softening point:

While using a KOKA-type flow tester (made by SHIMAZU Works Co., Ltd.), one gram of the pitch pulverized in the size of less than 100 mesh was put into the heated cylinder (10 mm in inner diameter and 1 mm in the diameter of the nozzle). A load of 10 kg f/cm² was applied on the specimen and the temperature of the cylinder was raised at a temperature-raising speed of 6° C./min. The temperature of the inflection point on the plasticization curve obtained as above was defined as the softening point of the pitch.

(3) Melt viscosity at a temperature of 300° C.:

While using a KOKA-type flow tester (made by SHIMAZU Works Co., Ltd.), the melt viscosity was calculated from the relation between the load and the rate of discharge at a temperature of 300° C.

(4) Amount of the component insoluble in the solvent:

The amount of the component insoluble in the solvent was measured while following Japanese Industrial Standards (JIS) K-2425.

(5) Molecular weight:

The molecular weight of the specimen was measured by a vapour pressure osmometer (VPO) while using pyridine as the solvent. As VPO, molecular weight-measuring apparatus type 117 made by CORONA Co., Ltd. was used, and as the standard substance, benzyl was used.

(6) Physical properties of carbon fiber and graphite fiber:

The diameter, the tensile strength and the tensile modulus of elasticity of the carbon fiber and the graphite fiber were measured while following "the test methods of carbon fiber, Japanese Industrial Standards (JIS) R-7601". Further, the measurement of the diameter of the fiber was carried out following the sectional area method.

EXAMPLE 1

Into a glass three-necked flask provided with a stirrer, 1000 g of naphthalene (first grade reagents, made by KANTO Chemical Co., Ltd.) and 100 g of AlCl₃ (first grade reagents, made by KANTO Chemical Co., Ltd.) as the catalyst were introduced, and naphthalene was polymerized therein for 24 hours at 210° C. After the polymerization was over, the reaction mixture was washed with water and filtered (by a filter of 0.2 μm in mesh) for the removal of the catalyst.

Then the thus obtained polymerizate of naphthalene was introduced in another pressure vessel and was thermally treated at 410° C. for 3 hours under a pressure of 3 kg f/cm²G in a closed system.

On observing the thus obtained pitch under a polarizing microscope, it was found that the pitch was optically isotropic. The quinoline insoluble material in this pitch was trace too.

The pitch was further heated at 360° C. for 4 hours under a reduced pressure of 30 Torr in a flow of nitrogen gas to remove the volatile materials.

The thus obtained pitch become to optically anisotropic (refer to the photograph of FIG. 1) and had the specific properties shown in Table 1.

TABLE 1

| Item | Measured value |
|---|---|
| Softening point (°C.) | 216 |
| Benzene-insoluble material (% by weight) | 54.8 |
| Quinoline-insoluble material (% by weight) | trace |
| H/C | 0.58 |
| Mean molecular weight | 1100 |
| Melt viscosity (poise, at 300° C.) | 75 |

In the next place, after introducing the pitch obtained as above into a cylinder having a nozzle of 0.3 mm in claiber, the pitch was molten by heating thereof at 285° to 290° C. and then the thus molten pitch was extruded through the above-mentioned nozzle under a pressure of nitrogen gas of 1.5 kg f/cm$^2$G to make fibers. The take-up speed was about 500 m/min. The thus obtained pitch fibers were heated to about 265° C. at a temperature-raising speed of about 1° C./min in an aerial atmosphere, and the thus heated pitch fibers were maintained, as they are, for about 30 min in the atmosphere to subject the pitch fibers to the treatment of infusibilization.

The thus infusibilized fibers were heated to about 900° C. at a temperature-raising speed of about 5° C./min in a nitrogen gas atmosphere and then the thus heated fibers were maintained for about 30 minutes as they are in the above-mentioned atmosphere to obtain the carbon fibers.

The mechanical properties of the thus obtained carbon fibers (diameter: 8.0 μm) are shown below.

Further, the pitch fibers obtained as above were subjected to the treatment of infusibilization, and after heating the thus infusibilized pitch fibers to about 900° C., the thus heated pitch fibers were heated to 2000° C. at a temperature-raising speed of about 50° C./min and maintained for about 10 minutes as they are in the above-mentioned atmosphere to obtain the graphite fibers (diameter: 7.5 μm). The mechanical properties of the thus obtained graphite fibers are shown below.

| Item | Tensile strength (kg f/mm$^2$) | Tensile modulus of elasticity (kg f/mm$^2$) |
|---|---|---|
| Carbon fiber (temperature of thermal treatment: 900° C.) | 275 | 16000 |
| Graphite fiber (temperature of thermal treatment: 2000° C.) | 400 | 40000 |

EXAMPLE 2

Into a glass three-necked flask provided with a stirrer, 1000 g of naphthalene (first grade reagents, made by KSANTO Chemical Co., Ltd.) and 100 g of AlCl$_3$ (first grade reagents, made by KANTO Chemical Co., Ltd.) as the catalyst were introduced, and naphthalene was polymerized therein at 250° for 3 hours.

After the polymerization was over, the reaction mixture was washed with water and filtered (by a filter of 0.2 μm in mesh) for the removal of the catalyst. Then the thus obtained polymerizate of naphthalene was thermally treated at 410° C. for 1 hour under a pressure of 2 kg f/cm$^2$G in a closed system. The thus obtained pitch was optically isotropic and was soluble in quinoline. The pitch was further heated for 4 hours at 360° C. under a reduced pressure of 25 Torr in a flow of nitrogen gas to remove the volatile material.

The thus obtained pitch became to optically anisotropic and had the specific properties shown in Table 2.

TABLE 2

| Item | Measured value |
|---|---|
| Softening point (°C.) | 206 |
| Benzene-insoluble material (% by weight) | 47.2 |
| Quinoline-insoluble material (% by weight) | trace |
| H/C | 0.59 |
| Mean molecular weight | 1200 |
| Melt viscosity (Poise, at 300° C.) | 25 |

In the next place, after introducing the pitch obtained as above into a cylinder having a nozzle of 0.3 mm in caliber, the pitch was molten by heating thereof at 275° to 280° C. and then, the thus molten pitch was extruded through the above-mentioned nozzle under a pressure of nitrogen gas of 1.4 kg f/cm$^2$G to make fibers. The take-up speed was about 600 m/min. The thus obtained pitch fibers were heated to about 250° C. at a temperature-raising speed of about 1° C./min in an aerial atmosphere, and the thus heated pitch fibers were maintained, as they are, for about 30 min in the atmosphere to subject the pitch fibers to the treatment of infusibilization.

The thus infusibilized fibers were heated to about 900° C. at a temperature-raising speed of about 5° C./min in a nitrogen gas atmosphere and then, the thus heated fibers were maintained for about 30 minutes as they are in the above-mentioned atmosphere to obtain the carbon fibers.

The mechanical properties of the thus obtained carbon fibers (diameter: 8.0 μm) are shown below.

Further, the pitch fibers obtained as above were subjected to the same treatment of infusibilization as in Example 1, and after heating the thus infusibilized pitch fibers to about 900° C., the thus heated pitch fibers were heated to 2000° C. at a temperature-raising speed of about 50° C./min and maintained for about 10 minutes as they are in the above-mentioned atmosphere to obtain the graphite fibers (diameter: 7.5 μm). The mechanical properties of the thus obtained graphite fibers are shown below.

| Item | Tensile strength (kg f/mm$^2$) | Tensile modulus of elasticity (kg f/mm$^2$) |
|---|---|---|
| Carbon fiber (temperature of thermal treatment: 900° C.) | 286 | 15,000 |
| Graphite fiber (temperature of thermal treatment: 2000° C.) | 410 | 38,000 |

EXAMPLE 3

Into a glass three-necked flask provided with a stirrer, 1000 g of naphthalene (first grade reagents, made by KANTO Chemical Co., Ltd.) and 100 g of AlCl$_3$ (first grade reagents, made by KANTO Chemical Co., Ltd.)

as the catalyst were introduced, and naphthalene was polymerized therein for 60 hours at 100° C. After introducing another 100 g of AlCl₃ into the flask, polymerization was carried out further for 30 hours at 210° C.

After the polymerization was over, the reaction mixture was washed with water and filtered (by a filter of 0.2 μm in mesh) for the removal of the catalyst. Then the thus obtained polymerizate of naphthalene was thermally treated at 430° C. for 1 hour under a pressure of 3.5 kg f/cm²G in a closed system. The thus obtained pitch was optically isotropic and was soluble in quinoline. The pitch was further heated for 4 hours at 365° C. under a reduced pressure of 30 Torr in a flow of nitrogen gas to remove the volatile material.

The thus obtained pitch became to optically anisotropic and had the specific properties shown in Table 3.

TABLE 3

| Item | Measured value |
| --- | --- |
| Softening point (°C.) | 218 |
| Benzene-insoluble material (% by weight) | 58.2 |
| Quinoline-insoluble material (% by weight) | 0.1 |
| H/C | 0.56 |
| Mean molecular weight | 1050 |
| Melt viscosity (poise, at 300° C.) | 85 |

In the next place, after introducing the pitch obtained as above into a cylinder having a nozzle of 0.3 mm in caliber, the pitch was molten by heating thereof at 285° to 290° C. and then the thus molten pitch was extruded through the above-mentioned nozzle under a pressure of nitrogen gas of 2.0 kg f/cm²G to make fibers. The take-up speed was about 450 m/min. The thus obtained pitch fibers were heated to about 270° C. at a temperature-raising speed of about 1.5° C./min in an aerial atmosphere, and the thus heated pitch fibers were maintained, as they are, for about 30 minutes in the atmosphere to subject the pitch fibers to the treatment of infusibilization.

The thus infusibilized fibers were heated to about 900° C. at a temperature-raising speed of about 5° C./min in a nitrogen gas atmosphere and then the thus heated fibers were maintained for about 30 minutes as they are in the above-mentioned atmosphere to obtain the carbon fibers.

The mechanical properties of the thus obtained carbon fibers (diameter: 8 μm) are shown below.

Further, the pitch fibers obtained as above were subjected to the same treatment of infusibilization as above, and after heating the thus infusibilized pitch fibers to about 900° C., the thus heated pitch fibers were heated to 2000° C. at a temperature-raising speed of about 50° C./min and maintained for about 10 minutes as they are in the above-mentioned atmosphere to obtain the graphite fibers (diameter: 7.5 μm). The mechanical properties of the thus obtained graphite fibers are shown below.

| Item | Tensile strength (kg f/mm²) | Tensile modulus of elasticity (kg f/mm²) |
| --- | --- | --- |
| Carbon fiber (temperature of thermal treatment: 900° C.) | 258 | 17,000 |
| Graphite fiber (temperature of thermal treatment: 2000° C.) | 370 | 45,000 |

EXAMPLE 4

Into a glass three-necked flask provided with a stirrer, 1000 g of naphthalene (first grade reagents, made by KANTO Chemical Co., Ltd.) and 100 g of AlCl₃ (first grade reagents, made by KANTO Chemical Co., Ltd.) as the catalyst were introduced, and naphthalene was polymerized therein for 24 hours at 210° C. After the polymerization was over, the reaction mixture was washed with water and filtered (by a filter of 0.2 μm in mesh) for the removal of the catalyst.

Then the thus obtained polymerizate of naphthalene was introduced in another vessel and was theremally treated at 410° C. for 3 hours under an atmospheric pressure. The thus obtained pitch was optically isotropic and was soluble in quinoline. The pitch was further heated for 4 hours at 360° C. under a reduced pressure of 25 Torr in a flow of nitrogen gas to remove the volatile material.

The thus obtained pitch became to optically anisotropic and had the specific properties shown in Table 4.

TABLE 4

| Item | Measured value |
| --- | --- |
| Softening point (°C.) | 218 |
| Benzene-insoluble material (% by weight) | 55.0 |
| Quinoline-insoluble material (% by weight) | trace |
| H/C | 0.57 |
| Mean molecular weight | 1100 |
| Melt viscosity (poise, at 300° C.) | 80 |

In the next place, after introducing the pitch obtained as above into a cylinder having a nozzle of 0.3 mm in caliber, the pitch was molten by heating thereof at 285° to 290° C. and then the thus molten pitch was extruded through the above-mentioned nozzle under a pressure of nitrogen gas of 1.5 kg f/cm²G to make fibers. The take-up speed was about 500 m/min. The thus obtained pitch fibers were heated to about 265° C. at a temperature-raising speed of about 1° C./min in an aerial atmosphere, and the thus heated pitch fibers were maintained, as they are, for about 30 min in the atmosphere to subject the pitch fibers to the treatment of infusibilization.

The thus infusibilized fibers were heated to about 900° C. at a temperature-raising speed of about 5° C./min in a nitrogen gas atmosphere and then the thus heated fibers were maintained for about 30 minutes as they are in the above-mentioned atmosphere to obtain the carbon fibers.

The mechanical properties of the thus obtained carbon fibers (diameter: 8.0 μm) are shown below.

Further, the pitch fibers obtained as above were subjected to the treatment of infusibilization, and after heating the thus infusibilized pitch fibers to about 900° C., the thus heated pitch fibers were heated to 2000° C. at a temperature-raising speed of about 50° C./min and maintained for about 10 minutes as they are in the above-mentioned atmosphere to obtain the graphite fibers (diameter: 7.5 μm). The mechanical properties of the thus obtained graphite fibers are shown below.

| Item | Tensile strength (kg f/mm²) | Tensile modulus of elasticity (kg f/mm²) |
| --- | --- | --- |
| Carbon fiber (temperature of thermal | 280 | 15,000 |

| Item | Tensile strength (kg f/mm²) | Tensile modulus of elasticity (kg f/mm²) |
| --- | --- | --- |
| treatment: 900° C.) | | |
| Graphite fiber (temperature of thermal treatment: 2000° C.) | 410 | 40,000 |

COMPARATIVE EXAMPLE 1

Into a glass three-necked flask provided with a stirrer, 1000 g of naphtha tar and 100 g of AlCl₃ as the catalyst were introduced, and the naphtha tar was polymerized for 3 hours at 250° C. After the polymerization was over, the reaction mixture was washed with water and filtered (by a filter of 0.2 μm in mesh) for the removal of the catalyst. The thus obtained polymerizate was treated by the conventional method in order to obtain a mesophase pitch. Namely, the polymerizate was subjected to thermal treatment for 60 min at 430° C. under a pressure of 15 Torr to obtain the pitch for spinning.

On observing the pitch under a polarizing microscope, it was found that the pitch was optically anisotropic. The specific properties of the thus obtained pitch are shown in Table 5.

TABLE 5

| Item | Measured value |
| --- | --- |
| Softening point (°C.) | 285 |
| Benzene-insoluble material (% by weight) | 88 |
| Quinoline-insoluble material (% by weight) | 45 |
| H/C | 0.52 |
| Mean molecular weight | 1000 |
| Melt viscosity (poise, at 300° C.) | over 10⁵ |

After introducing the thus obtained pitch for spinning into a cylinder having a nozzle of 0.3 mm in caliber, the pitch was molten by heating thereof to 380° to 400° C., and then, the thus molten pitch was extruded through the above-mentioned nozzle under a pressure of nitrogen gas of 1.5 kg f/cm²G. However, the spinnability of the pitch was poor and it was impossible to take up the extruded material as the fiber of 10 μm in diameter.

COMPARATIVE EXAMPLE 2

One thousand grams of naphthalene were polymerized as in Example 1 at 210° C. for 24 hours while using 20 g of AlCl₃ as the catalyst, and the catalyst was removed from the reaction mixture by washing thereof with water and filtering thereof.

Then, the polymerizate of naphthalene was treated by the conventional method in order to obtain a mesophase pitch as follows:

Namely, the polymerizate was subjected to thermal treatment at 420° C. for 90 minutes under a pressure of 10 Torr in order to obtain the pitch for spinning. On observing the thus obtained pitch under a polarizing microscope, it was found that the pitch was optically anisotropic. The specific properties of the thus obtained pitch are shown in Table 6.

TABLE 6

| Item | Measured value |
| --- | --- |
| Softening point (°C.) | 245 |
| Benzene-insoluble material (% by weight) | 88 |
| Quinoline-insoluble material (% by weight) | 25 |
| H/C | 0.51 |
| Mean molecular weight | 800 |
| Melt viscosity (poise, at 300° C.) | 10³ |

After introducing the pitch obtained as above into a cylinder having a nozzle of 0.3 mm in caliber, the pitch was molten by heating thereof at 330° to 340° C. and then, the thus molten pitch was extruded through the above-mentioned nozzle under a pressure of nitrogen gas of 2.0 kg f/cm²G to make fibers.

The take-up speed was about 400 m/min. The thus obtained pitch fibers were heated to about 300° C. at a temperature-raising speed of about 1.5° C./min in an aerial atmosphere, and the thus heated pitch fibers were maintained, as they are, for about 30 minutes in the atmosphere to subject the pitch fibers to the treatment of infusibilization.

The thus infusibilized fibers were heated to about 900° C. at a temperature-raising speed of about 5° C./min in a nitrogen gas atmosphere. However, cracks occurred in the thus obtained carbon fibers.

COMPARATIVE EXAMPLE 3

One thousand grams of naphthalene were polymerized as in Example 1 at 210° C. for 24 hours while using 100 g of AlCl₃ as the catalyst, and the catalyst was removed from the reaction mixture by washing thereof with water and filtering thereof.

By heating the thus obtained pitch at 400° C. for 15 minutes under a pressure of 15 Torr in a flow of nitrogen gas, the volatile materials were removed from the pitch.

Figure 2:
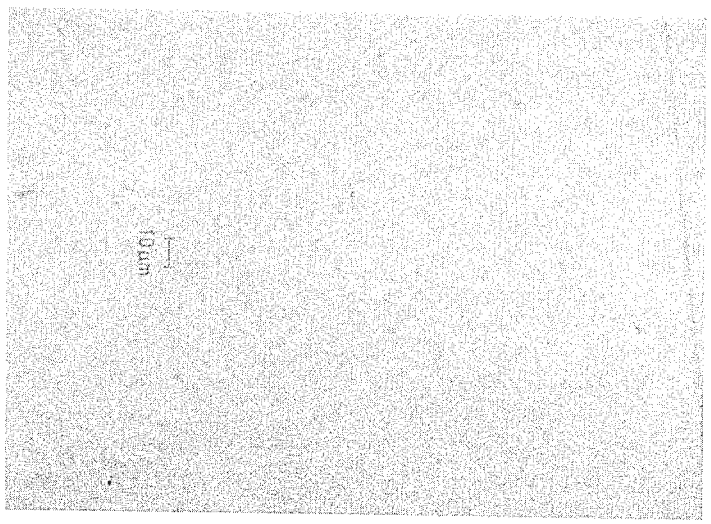
FIG. 2 is a polarizing microscopic photograph of the pitch obtained in Comparative Example 3 concerning the conventional technique.

On observing the thus obtained carbonaceous pitch under a polarizing microscope, it was found that the pitch was optically isotropic (refer to the photograph of FIG. 2) and had the specific properties shown in Table 7.

TABLE 7

| Item | Measured value |
| --- | --- |
| Softening point (°C.) | 195 |
| Benzene-insoluble material (% by weight) | 42.5 |
| Quinoline-insoluble material (% by weight) | 0 |
| H/C | 0.64 |
| Mean molecular weight | 1300 |
| Melt viscosity (poise, at 300° C.) | 20 |

After introducing the pitch obtained as above into a cylinder having a nozzle of 0.3 mm in caliber, the pitch was molten by heating thereof to 280° C. and then the thus molten pitch was extruded through the above-mentioned nozzle under a pressure of nitrogen gas of 1.0 kg f/cm²G to make fibers. The take-up speed was about 500 m/min. The thus obtained pitch fibers were heated to about 265° C. at a temperature-raising speed of about 1° C./min in an aerial atmosphere to subject the pitch fibers to the treatment of infusibilization.

The thus infusibilized fibers were heated to about 900° C. at a temperature-raising speed of about 5° C./min in a nitrogen gas atmosphere and then the thus heated fibers were maintained for about 30 minutes as they are in the above-mentioned atmosphere to obtain the carbon fibers. The mechanical properties of the thus obtained carbon fibers (diameter: 8 μm) are shown below.

Further, the pitch fibers obtained as above were subjected to the treatment of infusibilization as above, and after heating the thus infusibilized pitch fibers to about 900° C., the thus heated pitch fibers were further heated to 2000° C. at a temperature-raising speed of about 50° C./min and maintained for about 10 minutes as they are in the above-mentioned atmosphere to obtain the graphite fibers (diameter: 7.5 μm). The mechanical properties of the thus obtained graphite fibers are shown below.

| Item | Tensile strength (kg f/mm$^2$) | Tensile modulus of elasticity (kg f/mm$^2$) |
| --- | --- | --- |
| Carbon fiber (temperature of thermal treatment: 900° C.) | 258 | 14,000 |
| Graphite fiber (temperature of thermal treatment: 2000° C.) | 318 | 25,500 |

Namely, the carbon fibers and the graphite fibers obtained in Comparative Example 3 were inferior to the fibers obtained from the pitch according to the present invention, particularly in the point of the tensile modulus of elasticity.

What is claimed is:

1. A process for producing an optically anisotropic pitch for carbon materials having a quinoline insoluble component of not more than 0.5% by weight, comprising the steps of:
   (1) polymerizing naphthalene by heating at a temperature of 100° to 300° C. for 0.5 to 100 hours in the presence of a Lewis acid catalyst;
   (2) removing said catalyst from the reaction mixture;
   (3) subjecting said reaction mixture to thermal treatment at a temperature of 390° to 450° C. for 1 to 5 hours under a pressure of from not less than an atmospheric pressure to 5 kgf/cm$^2$G so as to produce neither a quinoline-insoluble pitch nor an optically anisotropic pitch, thereby carrying out aromatization of the polymerizate of naphthalene; and
   (4) heating the thus treated material at a temperature of 350° to 380° C. for 3 to 10 hours under a reduced pressure under the flow of an inert gas, thereby removing volatile components from said material and obtaining substantially quinoline soluble and optically anisotropic pitch.

2. The process according to claim 1, wherein said aromatization of the polymerizate of naphthalene is carried out at a temperature of 400° to 430° C. for 1 to 3 hours under a pressure of from not less than atmospheric pressure to 5 kgf/cm$^2$G.

3. An optically anisotropic pitch for carbon materials having a quinoline insoluble component content of not more than 0.5% by weight produced by the process according to claim 4, which has a softening point of 195° to 230° C., an atomic ratio of hydrogen to carbon (H/C) of from not less than 0.53 to less than 0.60, a mean molecular weight of 500 to 1500, a content of benzene-insoluble material of over 45% by weight and not more than 70% by weight and a melt-viscosity of 10 to 100 poise at a temperature of 300° C.

4. An optically anisotropic pitch for carbon materials having a quinoline insoluble component content of not more than 0.5% by weight, which has a softening point of 195° to 230° C., an atomic ratio of hydrogen to carbon (H/C) of from not less than 0.53 to less than 0.60, a mean molecular weight of 500 to 1500, a content of benzene-insoluble material of over 45% by weight and not more than 70% by weight and a melt-viscosity of 10 to 100 poise at a temperature of 300° C.

5. The process according to claim 1, wherein said Lewis acid catalyst is AlCl$_3$ or BF$_3$.

6. The process according to claim 1, wherein the treated material of step (4) is heated to a temperature of 360° to 370° C. for 4 to 6 hours under a pressure of 10 to 50 Torr.

* * * * *